United States Patent
Yeh et al.

(10) Patent No.: US 10,133,403 B2
(45) Date of Patent: Nov. 20, 2018

(54) SYSTEM AND METHOD FOR VARIABLE FRAME DURATION CONTROL IN AN ELECTRONIC DISPLAY

(71) Applicant: APPLE INC., Cupertino, CA (US)

(72) Inventors: Chih-Wei Yeh, Campbell, CA (US); Chaohao Wang, Sunnyvale, CA (US); Paolo Sacchetto, Cupertino, CA (US); Wei Chen, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 5 days.

(21) Appl. No.: 15/275,375

(22) Filed: Sep. 24, 2016

(65) Prior Publication Data

US 2018/0004340 A1 Jan. 4, 2018

Related U.S. Application Data

(63) Continuation of application No. 62/356,346, filed on Jun. 29, 2016.

(51) Int. Cl.
| | |
|---|---|
| *G06F 3/041* | (2006.01) |
| *G09G 3/20* | (2006.01) |
| *G09G 3/3258* | (2016.01) |
| *G09G 3/36* | (2006.01) |
| *G06F 3/0488* | (2013.01) |

(Continued)

(52) U.S. Cl.
CPC .......... *G06F 3/0416* (2013.01); *G09G 3/20* (2013.01); *G09G 3/3258* (2013.01); *G09G 3/3648* (2013.01); *G06F 1/3262* (2013.01); *G06F 3/03545* (2013.01); *G06F 3/03547* (2013.01); *G06F 3/0488* (2013.01); *G09G 3/3208* (2013.01); *G09G 2310/08* (2013.01); *G09G 2320/0261* (2013.01); *G09G 2320/103* (2013.01); *G09G 2320/106* (2013.01); *G09G 2330/021* (2013.01); *G09G 2340/0435* (2013.01)

(58) Field of Classification Search
CPC .. G06F 3/0416; G09G 3/3258; G09G 3/3648; G09G 2310/08; G09G 2330/021
See application file for complete search history.

(56) References Cited

U.S. PATENT DOCUMENTS

2007/0103424 A1* 5/2007 Huang .................. G09G 3/342
 345/102
2008/0291326 A1 11/2008 Shishido et al.
(Continued)

FOREIGN PATENT DOCUMENTS

| | | |
|---|---|---|
| CN | 104835464 A | 8/2015 |
| WO | 2015171645 A1 | 11/2015 |

OTHER PUBLICATIONS

International Search Report and Written Opinion for PCT Application No. PCT/US2017/0333344 dated Aug. 23, 2017.

*Primary Examiner* — Christopher E Leiby
(74) *Attorney, Agent, or Firm* — Fletcher Yoder PC

(57) ABSTRACT

Devices and methods for improving image quality and decreasing power consumption of an electronic display are provided. The electronic device includes a display panel including a plurality of pixels configured to display an image, and to operate at multiple refresh rates. The electronic device also includes a processor configured to instruct the display panel to transition between the multiple refresh rates based at least in part on a blur effective width of the image.

19 Claims, 9 Drawing Sheets

(51) Int. Cl.
    *G06F 1/32*       (2006.01)
    *G09G 3/3208*     (2016.01)
    *G06F 3/0354*     (2013.01)

(56) References Cited

U.S. PATENT DOCUMENTS

| | | |
|---|---|---|
| 2010/0214328 A1 | 8/2010 | Hara |
| 2012/0113080 A1 | 5/2012 | den Boer |
| 2013/0141642 A1 | 6/2013 | Wu et al. |
| 2013/0187897 A1 | 7/2013 | Liu |
| 2013/0257752 A1 | 10/2013 | Tripathi et al. |
| 2013/0328845 A1 | 12/2013 | Pylappan et al. |
| 2014/0118399 A1* | 5/2014 | Todorovich ........... G06T 3/4038 345/634 |
| 2014/0313236 A1* | 10/2014 | Jang ..................... G09G 5/00 345/690 |
| 2015/0279334 A1 | 10/2015 | Kwa et al. |
| 2015/0348509 A1 | 12/2015 | Verbeure et al. |
| 2015/0348511 A1 | 12/2015 | Oriol et al. |
| 2016/0246431 A1* | 8/2016 | Ma ........................ G06F 3/044 |
| 2017/0116933 A1 | 4/2017 | Xu |

\* cited by examiner

SYSTEM AND METHOD FOR VARIABLE FRAME DURATION CONTROL IN AN ELECTRONIC DISPLAY

CROSS-REFERENCE TO RELATED APPLICATIONS

This application claims the benefit of U.S. Provisional Application No. 62/356,346 entitled "System and Method for Variable Frame Duration Control in an Electronic Display" filed on Jun. 29, 2016, which is incorporated by reference herein its entirety for all purposes

BACKGROUND

This disclosure relates to refresh rates in electronic displays. More specifically, the current disclosure provides systems and methods for electronic displays to control refresh rates to limit power consumption during operation of the electronic displays.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many electronic devices include electronic displays. As refresh rates of the electronic displays increase, power consumption by the electronic devices may also increase. The increase in power consumption may reduce battery life of portable electronic devices or increase operating costs associated with corded electronic devices. Further, the electronic devices may operate at refresh rates that are inefficient for displaying images moving too fast or too slow for the refresh rate of the electronic devices. As a result, the display panel may have image reduced image quality, or the display panel may experience excessive power consumption.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

To improve image quality and decrease power consumption of a display, variable frame duration may be implemented by an electronic device. For example, the variable frame duration may improve image quality of moving images and decrease power consumption of stagnant images or slower moving images. In the current embodiments, image velocity of images on a display of an electronic device may be measured. The measured image velocity may be compared to image velocity thresholds to determine an appropriate refresh rate of the display for maximizing image quality and minimizing power consumption.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

This disclosure relates to variable frame duration of a display of an electronic device. More specifically, the current embodiments describe techniques for improving image quality and decreasing power consumption of displays of electronic devices by implementing variable frame duration techniques. These techniques may be performed by sensing image velocity on a display and dynamically adjusting frame refresh rates of the display based on the sensed image velocity. As described in detail below, various systems and methods relating to variable frame duration of the display may be used to improve image quality and decrease power consumption of the electronic device.

Figure 1:
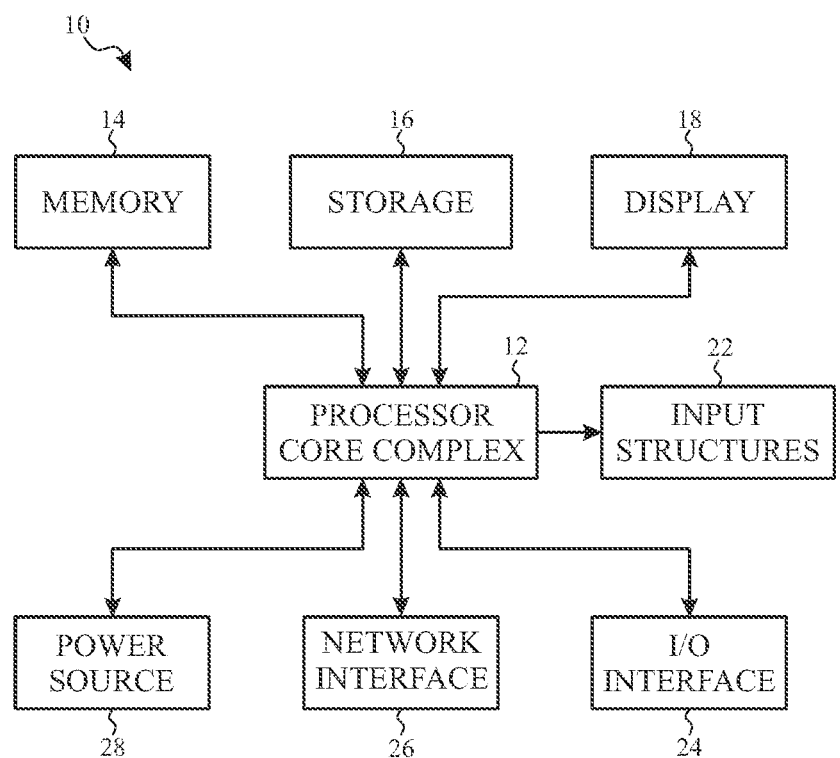
FIG. 1 is a schematic block diagram of an electronic device including a display, in accordance with an embodiment.

Turning first to FIG. 1, an electronic device 10 according to an embodiment of the present disclosure may include, among other things, a processor core complex 12 having one or more processor(s), memory 14, nonvolatile storage 16, a display 18, input structures 22, an input/output (I/O) interface 24, network interfaces 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
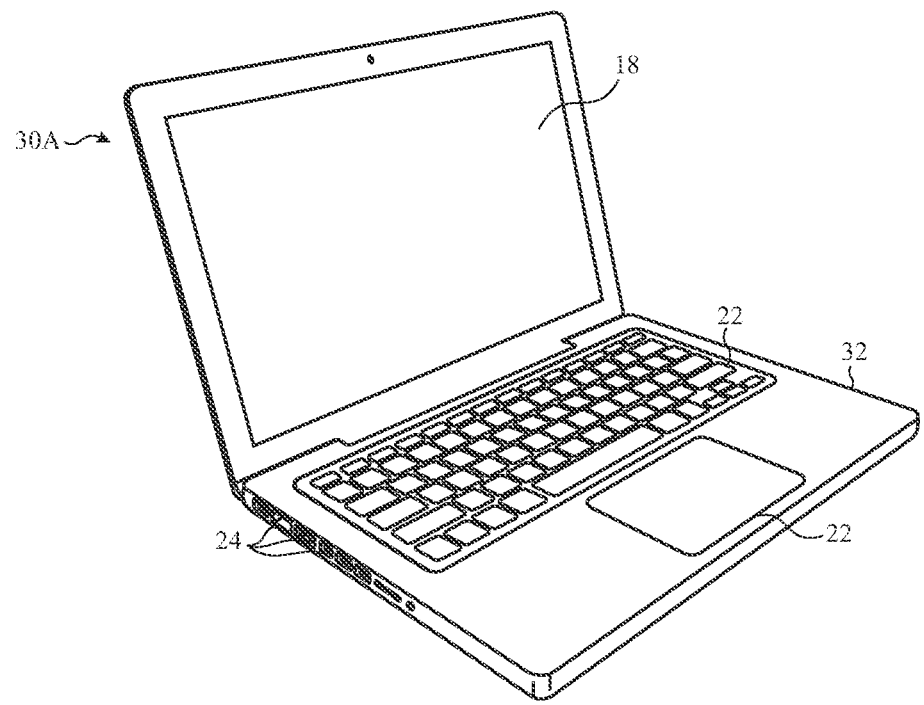
FIG. 2 is a perspective view of a notebook computer representing an embodiment of the electronic device of FIG. 1, in accordance with an embodiment.
Figure 3:
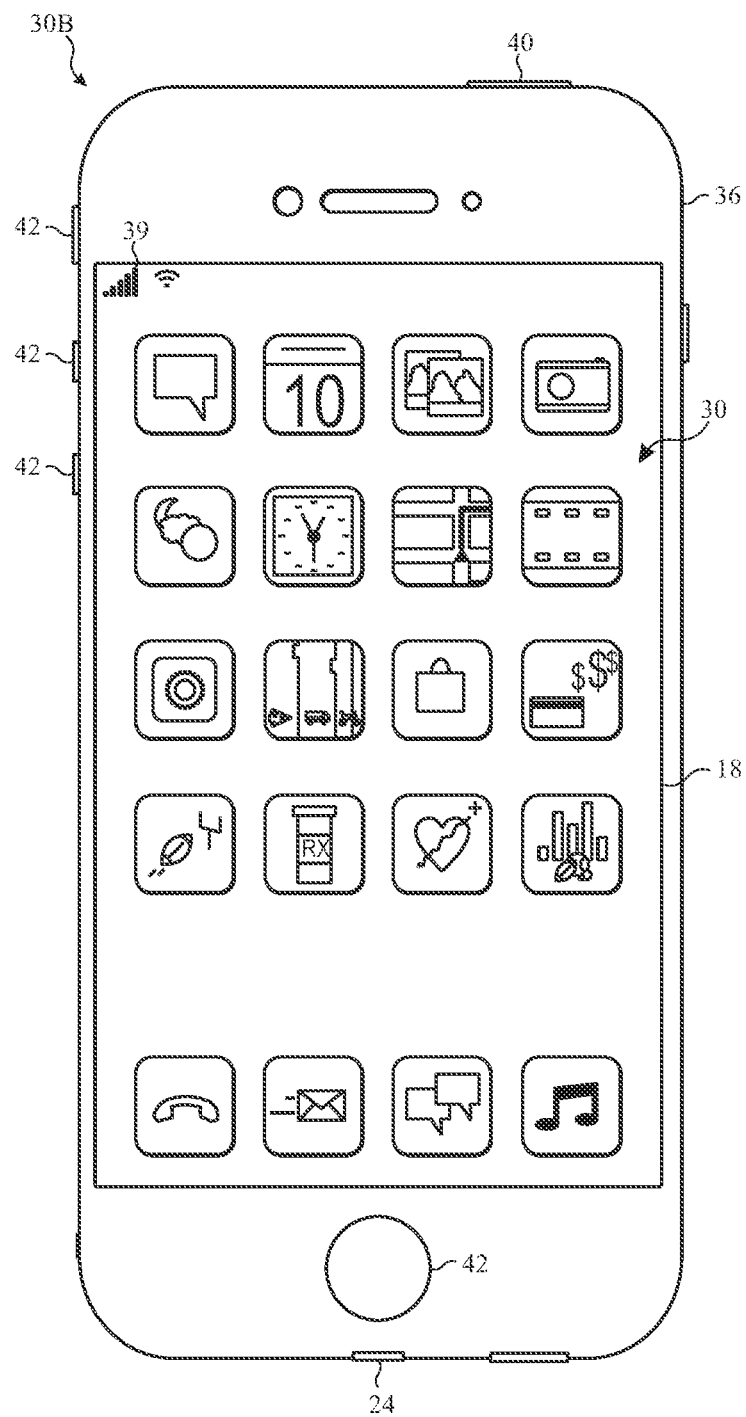
FIG. 3 is a front view of a hand-held device representing another embodiment of the electronic device of FIG. 1, in accordance with an embodiment.
Figure 4:
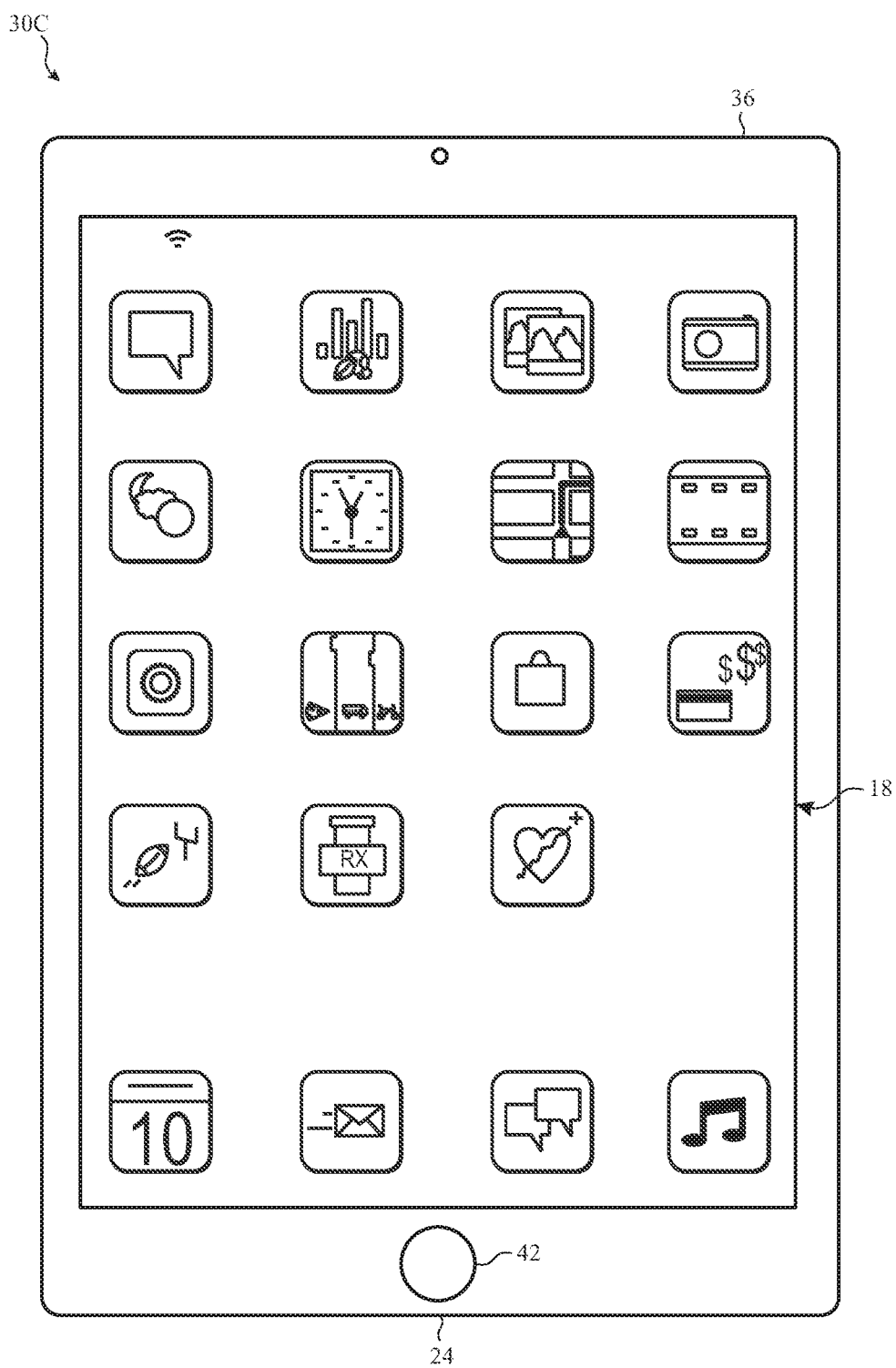
FIG. 4 is a front view of another hand-held device representing another embodiment of the electronic device of FIG. 1, in accordance with an embodiment.
Figure 5:
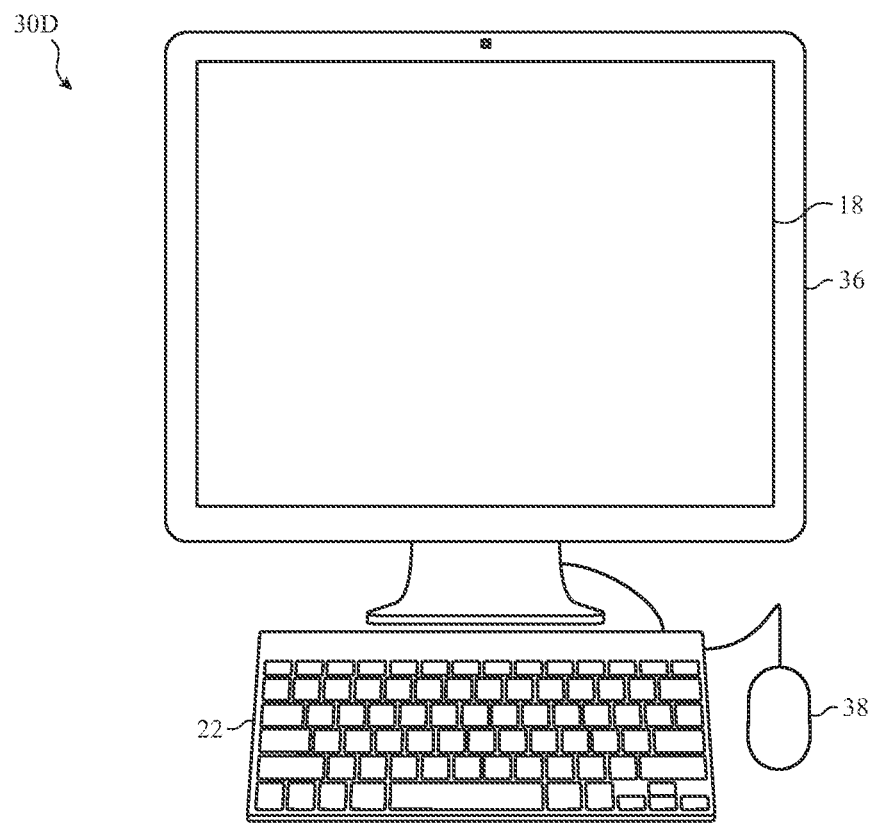
FIG. 5 is a front view of a desktop computer representing another embodiment of the electronic device of FIG. 1, in accordance with an embodiment.
Figure 6:
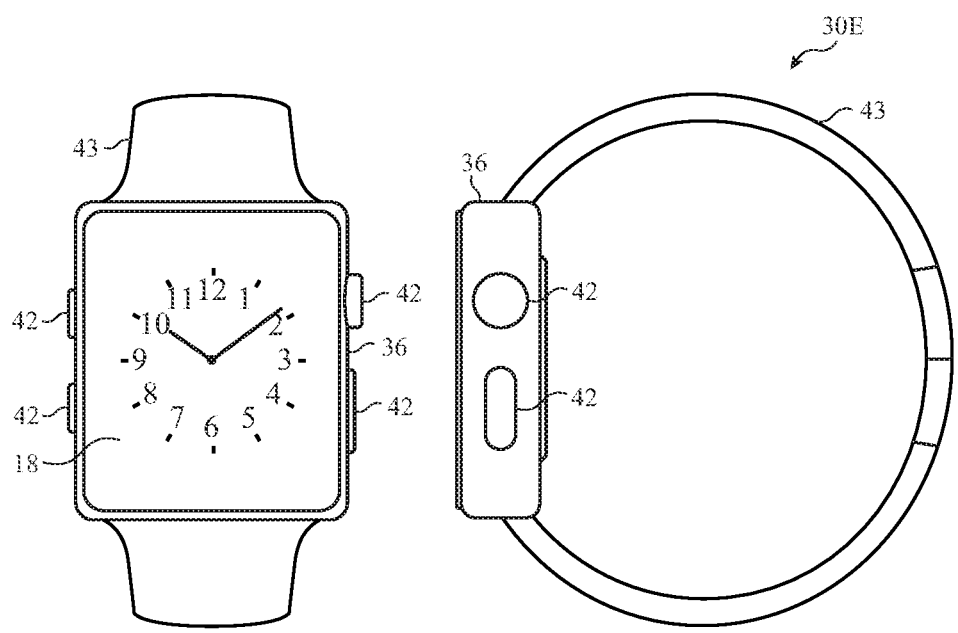
FIG. 6 is a front view and a side view of a wearable electronic device representing another embodiment of the electronic device of FIG. 1, in accordance with an embodiment.

By way of example, the electronic device 10 may represent a block diagram of the notebook computer depicted in FIG. 2, the handheld devices depicted in FIGS. 3 and 4, the desktop computer depicted in FIG. 5, the wearable electronic device depicted in FIG. 6, or similar devices. It should be noted that the processor core complex 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor core complex 12 and/or other data processing circuitry may be operably coupled with the memory 14 and the nonvolatile storage 16 to perform various algorithms. Such programs or instructions executed by the processor core complex 12 may be stored in any suitable article of manufacture that may include one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor core complex 12 to enable the electronic device 10 to provide various functionalities.

The display 18 may include pixels such as organic light emitting diodes (OLEDs), micro-light-emitting-diodes (µ-LEDs), or any other light emitting diodes (LEDs). Further, the display 18 is not limited to a particular pixel type, as the circuitry and methods disclosed herein may apply to any pixel type. For example, the display 18 may also be a liquid crystal display (LCD). Accordingly, the present disclosure may relate to a broad range of lighting components and/or pixel circuits within display devices.

The input structures 22 of the electronic device 10 may enable a user to interact with the electronic device 10 (e.g., pressing a button to increase or decrease a volume level). The input structures 22, as used herein, may generally include any input devices that may determine and/or affect display content motion speed on the display 18. The I/O interface 24 may enable the electronic device 10 to interface with various other electronic devices, as may the network interfaces 26. The network interfaces 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a $3^{rd}$ generation (3G) cellular network, $4^{th}$ generation (4G) cellular network, or long term evolution (LTE) cellular network. The network interface 26 may also include interfaces for, for example, broadband fixed wireless access networks (WiMAX), mobile broadband Wireless networks (mobile WiMAX), asynchronous digital subscriber lines (e.g., 1SSL, VDSL), digital video broadcasting-terrestrial (DVB-T) and its extension DVB Handheld (DVB-H), ultra Wideband (UWB), and so forth.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include a housing or enclosure 32, a display 18, input structures 22, and ports of an I/O interface 24. In one embodiment, the input structures 22 (such as a keyboard and/or a touchpad) may be used to interact with the computer 30A, such as to start, control, or operate a GUI or applications running on computer 30A. For example, a keyboard and/or touchpad may allow a user to navigate a user interface or application interface displayed on display 18.

FIG. 3 depicts a front view of a handheld device 30B, which represents one embodiment of the electronic device 10. The handheld device 30B may represent, for example, a portable phone, a media player, a personal data organizer, a handheld game platform, or any combination of such devices. By way of example, the handheld device 30B may be a model of an iPod® or iPhone® available from Apple Inc. of Cupertino, Calif.

The handheld device 30B may include an enclosure 36 to protect interior components from physical damage and to shield them from electromagnetic interference. The enclosure 36 may surround the display 18, which may display indicator icons 39. The indicator icons 39 may indicate, among other things, a cellular signal strength, Bluetooth connection, and/or battery life. The I/O interfaces 24 may open through the enclosure 36 and may include, for example, an I/O port for a hard wired connection for charging and/or content manipulation using a standard connector and protocol, such as the Lightning connector provided by Apple Inc., a universal service bus (USB), or other similar connector and protocol.

User input structures 42, in combination with the display 18, may allow a user to control the handheld device 30B. For example, the input structure 40 may activate or deactivate the handheld device 30B, the input structure 42 may navigate user interface to a home screen, a user-configurable application screen, and/or activate a voice-recognition feature of the handheld device 30B, the input structures 42 may provide volume control, or may toggle between vibrate and ring modes. The input structures 42 may also include a microphone may obtain a user's voice for various voice-related features, and a speaker may enable audio playback and/or certain phone capabilities. The input structures 42 may also include a headphone input may provide a connection to external speakers and/or headphones. The input structures 42, as used herein, may generally include any input devices that may determine and/or affect display content motion speed on the display 18.

FIG. 4 depicts a front view of another handheld device 30C, which represents another embodiment of the electronic device 10. The handheld device 30C may represent, for example, a tablet computer, or one of various portable computing devices. By way of example, the handheld device 30C may be a tablet-sized embodiment of the electronic device 10, which may be, for example, a model of an iPad® available from Apple Inc. of Cupertino, Calif.

Turning to FIG. 5, a computer 30D may represent another embodiment of the electronic device 10 of FIG. 1. The computer 30D may be any computer, such as a desktop computer, a server, or a notebook computer, but may also be a standalone media player or video gaming machine. By way of example, the computer 30D may be an iMac®, a MacBook®, or other similar device by Apple Inc. It should be noted that the computer 30D may also represent a personal computer (PC) by another manufacturer. A similar enclosure 36 may be provided to protect and enclose internal components of the computer 30D such as the display 18. In certain embodiments, a user of the computer 30D may interact with the computer 30D using various peripheral input devices, such as the input structures 22 or mouse 38, which may connect to the computer 30D via a wired and/or wireless I/O interface 24.

Similarly, FIG. 6 depicts a wearable electronic device 30E representing another embodiment of the electronic device 10 of FIG. 1 that may be configured to operate using the techniques described herein. By way of example, the wearable electronic device 30E, which may include a wristband 43, may be an Apple Watch® by Apple, Inc. However, in other embodiments, the wearable electronic device 30E may include any wearable electronic device such as, for example, a wearable exercise monitoring device (e.g., pedometer, accelerometer, heart rate monitor), or other device by another manufacturer. The display 18 of the wearable electronic device 30E may include a touch screen, which may allow users to interact with a user interface of the wearable electronic device 30E. Additionally, it may be appreciated that the techniques described herein may also be used with a television, a wearable display, a head mount display, a projection display, or any other electronic device 10 using a display 18.

Figure 7:
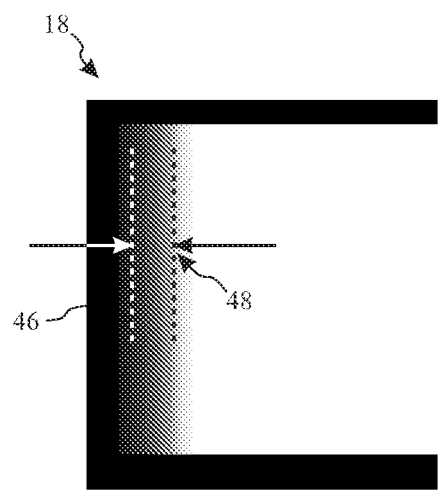
FIG. 7 is a portion of a display of the electronic device of FIG. 1, in accordance with an embodiment.

The display 18 for the electronic device 10 may include a variable frame duration technique for controlling a refresh rate of the display 18. To help illustrate, FIG. 7 depicts a portion of the display 18 including a moving image 46. As illustrated, the moving image 46 may include a blur effective width 48. The blur effective width 48 may be proportional to an image velocity multiplied by a frame duration of the display 18. The image velocity may be defined as the velocity of the moving image 46 as the moving image 46 moves across the display. Additionally, the image velocity may be a number of pixels travelled per second by the moving image 46, the number of pixels travelled per frame by the moving image 46, or any other velocity measurement of the moving image 46 as the moving image 46 moves across the display 18. Further, the frame duration may be an amount of time a single frame stays on the display 18. For example, for a video displayed at a frequency of 120 Hz, the frame duration may be approximately 8.3 milliseconds. That is, each frame is on the screen for only 8.3 milliseconds of time. Accordingly, as the image velocity increases and/or the frame duration of the display 18 increases (i.e., the frequency is reduced), the blur effective width 48 also increases. Through an increase in the blur effective width 48, sharpness of the moving images 46 on the display 18 is decreased.

Figure 8:
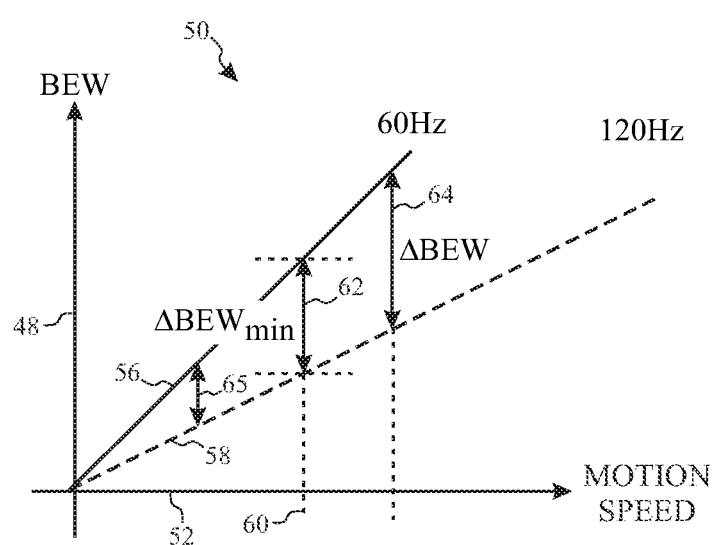
FIG. 8 is a chart illustrating image motion speed versus blur effective width of the display of FIG. 7, in accordance with an embodiment.

To help illustrate the blur effective width 48, FIG. 8 is a chart 50 illustrating image motion speed 52 versus the blur effective width 48. As mentioned above, as the frequency of the refresh rate of the display 18 increases, the blur effective width 48 decreases. In this manner, the chart 50 depicts a line 56 representing the blur effective rate 48 over a range of image motion speeds 52 while the display 18 has a refresh rate of 60 Hz. Additionally, the chart 50 depicts a line 58 that represents the blur effective rate 48 over the range of image motion speeds 52 while the display 18 has a refresh rate of 120 Hz.

As discussed in detail below, the electronic device 10 may alter the refresh rate of the display 18 based on the image motion speeds 52 of the moving images 46. For example, the chart 50 illustrates an image velocity threshold 60 at a minimum blur effective width difference 62 between the lines 56 and 58. The minimum blur effective width difference 62 may be defined as the minimum blur effective width difference that is perceivable to a person watching the display 18. That is, when the image motion speed 52 exceeds the image velocity threshold 60, there is a perceivable difference in the blur effective width 48 of the moving image 46 when displaying the moving image 46 at a 60 Hz refresh rate and at a 120 Hz refresh rate. Further, when the image motion speed 52 is less than the image velocity threshold 60, the difference in the blur effective width 48 at the two refresh rates is either not perceivably different, or not perceivably different enough to merit the increased power consumption of the greater refresh rate of the display 18.

By way of example, a blur effective width difference 64 is larger than the minimum blur effective width 62. Accordingly, if the display 18 was operating at a 60 Hz refresh rate prior to reaching the blur effective width difference 64, the processor core complex 12 of the electronic device 10 may instruct the display 18 to increase the refresh rate to 120 Hz once the blur effective width difference 64 exceeds the minimum blur effective width difference 62 to increase sharpness of the moving image 46 on the display 18. Alternatively, if the display was operating at a 120 Hz refresh rate prior to reaching a blur effective width difference 65, which is lower than the minimum blur effective width difference 62, the processor core complex 12 may instruct the display 18 to decrease the refresh rate to 60 Hz to reduce power consumption by the display 18 without sacrificing image quality and sharpness.

Figure 9:
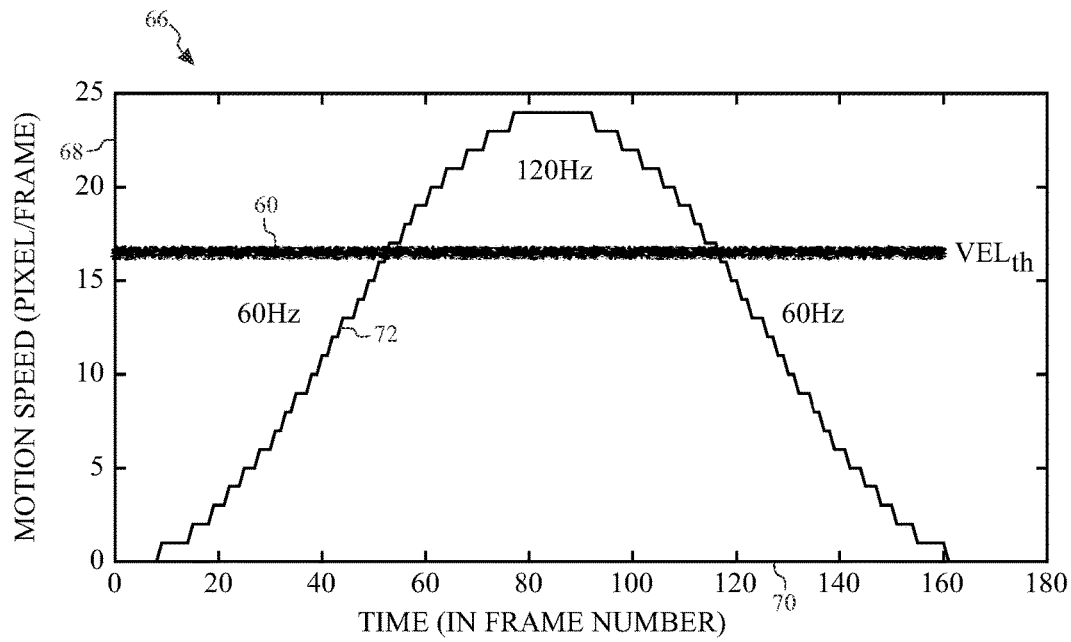
FIG. 9 is a chart illustrating image motion speed over time of the display of FIG. 7 and an image velocity threshold, in accordance with an embodiment.

To further illustrate, FIG. 9 is a chart 66 illustrating image motion speed 68 over time 70 of the moving image 46 on the display 18. The motion speed 68 may be in the unit of pixels per frame, as illustrated. That is, the motion speed 68 represents a number of pixels that the moving image 46 moves per frame. Further, the time 70 is illustrated as a number of frames. It may also be appreciated that both the motion speed 68 and the time 70 may also be represented in units of time (e.g., seconds or milliseconds) rather than numbers of frames.

As illustrated, the chart 66 includes the image velocity threshold 60. While the image velocity threshold 60 is illustrated as set to approximately 16 pixels/frame, it may be appreciated that the image velocity threshold 60 may be increased or decreased based on the minimum blur effective width difference 62. That is, the image velocity threshold 60 may increase or decrease to track the motion speed 68 of the minimum blur effective width difference 62. Accordingly, the image velocity threshold 60 may be in the range of approximately 5 pixels/frame to approximately 20 pixels/frame or more.

Additionally, the motion speed 68 of the moving image 46 over the time 70 is represented by a line 72. As illustrated, when the line 72 is at a motion speed range below the image velocity threshold 60, the display 18 may operate at a 60 Hz refresh rate. Alternatively, when the line 72 is at a motion speed range above the image velocity threshold 60, the display 18 may operate at a 120 Hz refresh rate. It may also be appreciated that while FIG. 9 depicts a threshold between a 60 Hz refresh rate and a 120 Hz refresh rate, more image velocity thresholds 60 may be established for refresh rates that are higher and lower than the depicted 60 Hz and 120 Hz refresh rates.

Figure 10:
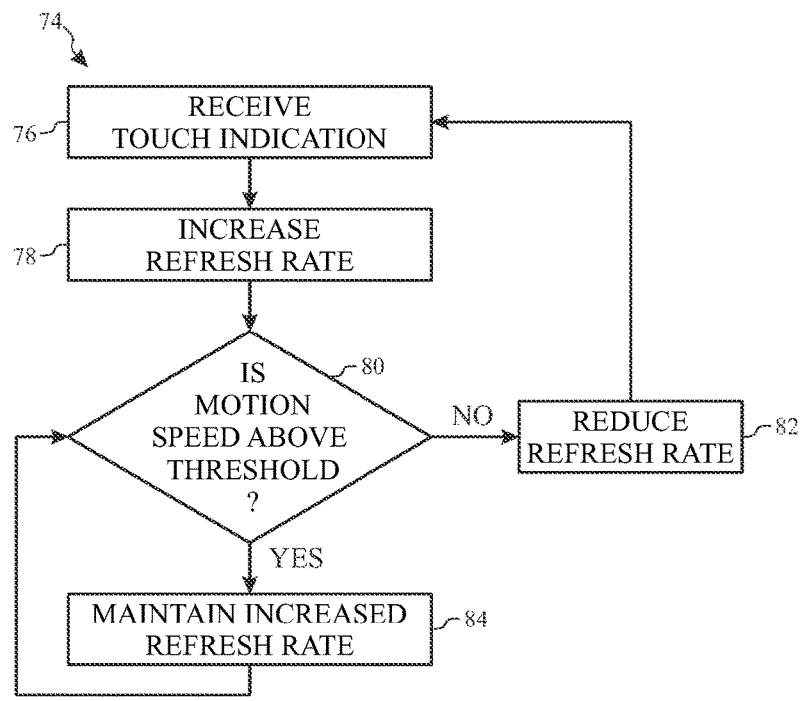
FIG. 10 is a flow chart describing variable frame duration based on the image velocity threshold of FIG. 9, in accordance with an embodiment.

Turning now to FIG. 10, a flow chart 74 describing variable frame duration based on the image velocity threshold 60 is provided. Initially, at block 76, a display 18 of the electronic device 10 may receive a touch indication. The touch indication may be representative of an operator of the electronic device 10 touching the display 18 to manipulate the image on the display 18. For example, when the operator touches the display 18 to scroll up or down on the image displayed on the display 18, the electronic device 10 may provide an indication to the processor core complex 12 that the operator has touched the display 18.

Upon receiving the touch indication, the refresh rate of the display 18 may be increased at block 78. To accommodate the increase in the motion speed 68 of the moving image 46 that is expected upon receiving the touch indication, the display 18 may automatically increase the refresh rate to improve image quality of the moving image 46. By increasing the refresh rate of the display 18, the blur effective width 48 resulting from the movement of the moving image 46 may be reduced.

Subsequently, at block 80, a determination may be made as to whether the motion speed 68 of the moving image 46 is greater than the image velocity threshold 60. If the motion speed 68 is less than the image velocity threshold 60, the display 18 may reduce the refresh rate, at block 82, to the refresh rate of the display 18 prior to receiving the touch indication. By reducing the refresh rate, the electronic device 10 may reduce power consumption by the display 18. Further, because the motion speed 68 is less than the image velocity threshold 60, the minimum blur effective width difference 62 between the higher and lower refresh rates may be greater than a blur effective width difference between the moving image 46 displayed at the higher and lower refresh rates. Accordingly, the operator of the electronic device 10 may not be able to perceive a difference in image quality between the two refresh rates when the motion speed 68 of the moving image 46 is below the image velocity threshold 60. Further, after reducing the refresh rate of the display 18, the electronic device 10 may await another touch indication at block 76 to repeat the flow chart 74.

If the motion speed 68 of the moving image 46 is greater than the image velocity threshold 60, the increased refresh rate may be maintained at block 84. Additionally, the motion speed 68 may be reassessed against the image velocity threshold 60, at block 80, until the motion speed 68 falls below the image velocity threshold 60. At such a point, the refresh rate of the display 18 may be reduced, at block 82, and the electronic device 10 may await another touch indication at block 76 to repeat the flow chart 74. It may be appreciated that the order or sequence of the blocks 76-84 may be varied or re-sequenced according to alternative embodiments. Further, while the flow chart 74 indicates a touch indication as the motivation for beginning the process of increasing the refresh rate of the display 18, the processor core complex 12 may instruct the display 18 to vary the refresh rate based on the motion speed 68 of the moving image 46 absent any touch indication.

Figure 11:
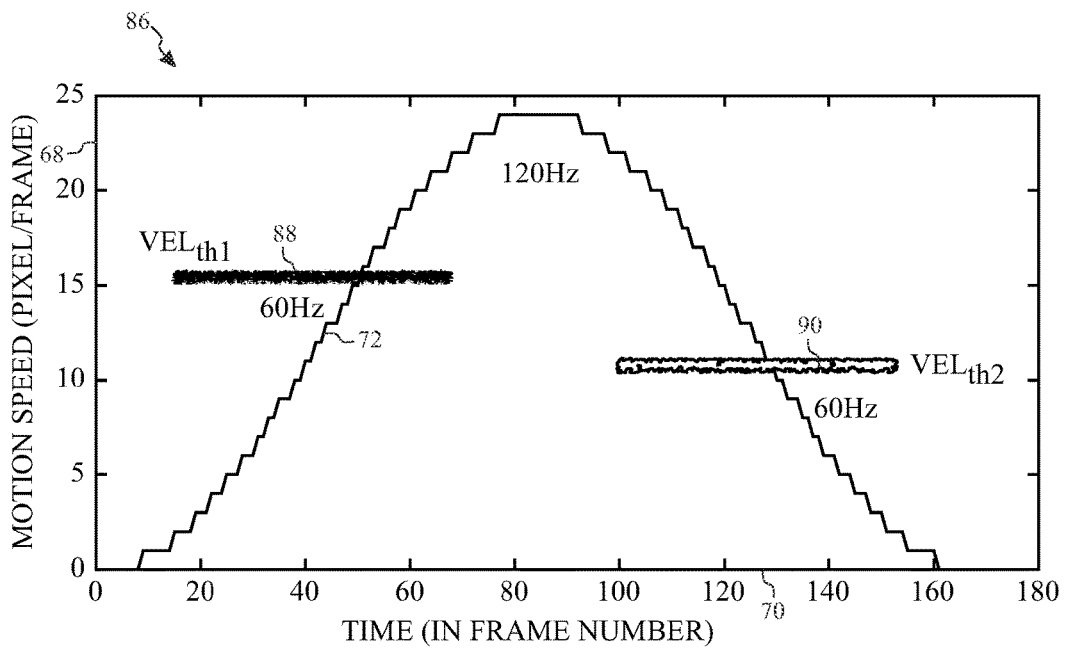
FIG. 11 is a chart illustrating image motion speed over time of the display of FIG. 7 and a first image velocity threshold and a second image velocity threshold, in accordance with an embodiment.

FIG. 11 provides a chart 86 illustrating the image motion speed 68 over the time 70 of the moving image 46 on the display 18. The motion speed 68 may be in the unit of pixels per frame, as illustrated. That is, the motion speed 68 represents a number of pixels that the moving image 46 moves per frame. Further, the time 70 is illustrated as a number of frames. It may also be appreciated that both the motion speed 68 and the time 70 may also be represented in units of time rather than numbers of frames.

As illustrated, the chart 86 includes a high image velocity threshold 88 and a low image velocity threshold 90. While the high image velocity threshold 88 is set to approximately 15 pixels/frame, and the low image velocity threshold 90 is set to approximately 11 pixels/frame, it may be appreciated that the image velocity thresholds 88 and 90 may be increased or decreased based on the minimum blur effective width difference 62. That is, the image velocity thresholds 88 and 90 may increase or decrease to maintain a relationship with the motion speed 68 of the minimum blur effective width difference 62. Accordingly, the image velocity thresholds 88 and 90 may be in the range of approximately 5 pixels/frame to approximately 20 pixels/frame or more.

Additionally, the motion speed 68 of the moving image 46 over the time 70 is represented by the line 72. As illustrated, when the line 72 is at a motion speed range below the high image velocity threshold 88, the display 18 may operate at a 60 Hz refresh rate. Alternatively, when the line 72 is at a motion speed range above the high image velocity threshold 88, the display 18 may operate at a 120 Hz refresh rate.

It may also be appreciated that once the line 72 exceeds the high image velocity threshold 88, the velocity threshold may decrease to the low image velocity threshold 90. For example, when the display 18 transitions from a 120 Hz refresh rate to a 60 Hz refresh rate, the low image velocity threshold 90 may be a value less than the high image velocity threshold 88. Lowering the image velocity threshold to the low image velocity threshold 90 in such an instance may prevent the display 18 from transitioning away from the higher refresh rate prematurely during a momentary slow-down of the moving image 46.

Figure 12:
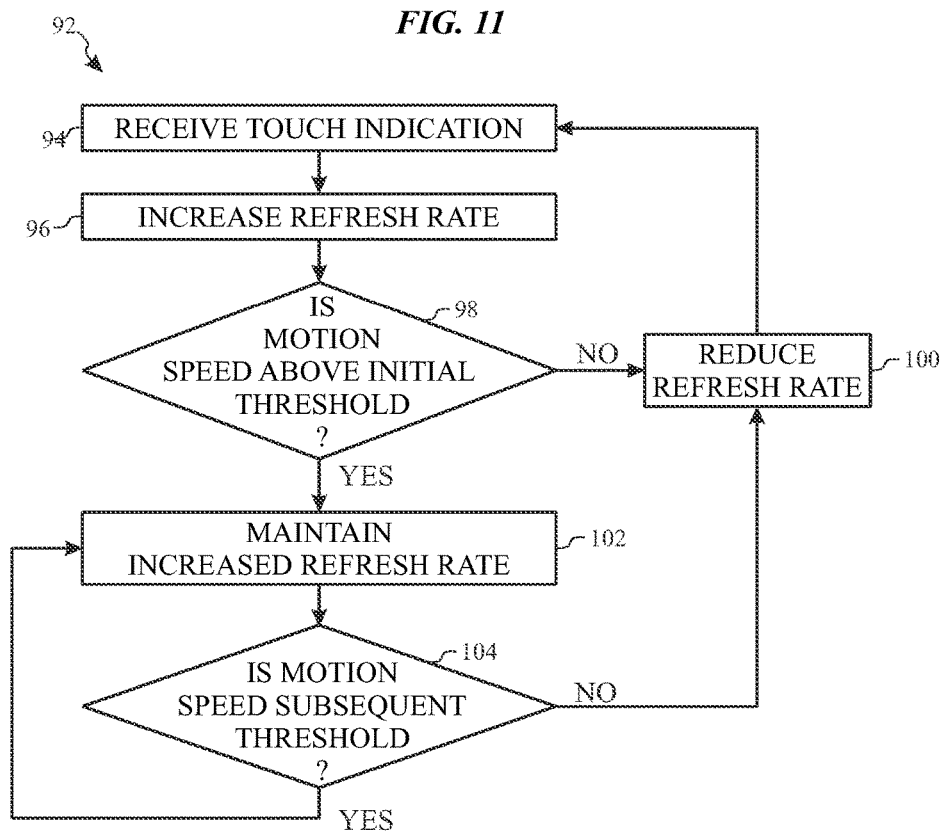
FIG. 12 is a flow chart describing variable frame duration based on the first and second image velocity thresholds of FIG. 11, in accordance with an embodiment.

To help illustrate the varying image velocity thresholds 88 and 90, FIG. 12 is a flow chart 92 describing variable frame duration based on multiple image velocity thresholds (e.g., image velocity thresholds 88 and 90) of a display 18. Initially, at block 94, a display 18 of the electronic device 10 may receive a touch indication. The touch indication may be representative of an operator of the electronic device 10 touching the display 18 to manipulate the image on the display 18. For example, when the operator touches the display 18 to scroll up or down on the image displayed on the display 18, the electronic device 10 may provide an indication to the processor core complex 12 that the operator has touched the display 18.

Upon receiving the touch indication, the refresh rate of the display 18 may be increased at block 96. To accommodate the increase in the motion speed 68 of the moving image 46 that is expected upon receiving the touch indication, the display 18 may automatically increase the refresh rate to improve image quality of the moving image 46. By increasing the refresh rate of the display 18, the blur effective width 48 resulting from the movement of the moving image 46 may be reduced.

Subsequently, at block 98, a determination may be made as to whether the motion speed 68 of the moving image 46 is greater than the high image velocity threshold 88. In some embodiments, such as in a situation where the display 18 does not receive a touch indication, the flow chart 92 may actually begin at block 98 by measuring the motion speed 68 of the moving image 46. If the motion speed is less than the high image velocity threshold 88, the display 18 may reduce the refresh rate, at block 100, to the refresh rate of the display 18 prior to receiving the touch indication. By reducing the refresh rate, the electronic device 10 may reduce power consumption by the display 18. Further, because the motion speed 68 is less than the image velocity threshold 60, the minimum blur effective width difference 62 between the higher and lower refresh rates may be greater than a blur effective width difference between the present moving image 46 when displayed at the higher and lower refresh rates. Accordingly, the operator of the electronic device 10 may not be able to perceive a difference in image quality between the two refresh rates when the motion speed 68 of the moving image 46 is below the high image velocity threshold 88. Further, after reducing the refresh rate of the display 18, the electronic device 10 may await another touch indication at block 94 to repeat the flow chart 92 or an indication that the motion speed 68 is greater than the high image velocity threshold 88 in the case of the display 18 not receiving a touch indication while the moving image 46 increased the motion speed 68.

If the motion speed 68 of the moving image 46 is greater than the high image velocity threshold 88, the increased refresh rate may be maintained at block 102 or established in the case of the display 18 not receiving a touch indication at block 94. Additionally, the motion speed 68 may be assessed against the low image velocity threshold 90, at block 104, until the motion speed 68 falls below the low image velocity threshold 90. At such a point, the refresh rate of the display 18 may be reduced, at block 100, and the electronic device 10 may await another touch indication at block 94 to repeat the flow chart 92.

As mentioned above in the discussion of FIG. 11, the low image velocity threshold 90 may prevent lowering the refresh rate prematurely to avoid cycling between a lower and a higher refresh rate of the display 18. Moreover, while FIGS. 11 and 12 illustrate the image velocity threshold 90 as lower than the image velocity threshold 88, in some embodiments, the image velocity threshold 90 may be greater than the image velocity threshold 88. Further, in some embodiments, such as when the display 18 is operable at a 240 Hz refresh rate and/or a 30 Hz refresh rate, additional image velocity thresholds may be implemented to transition between the various refresh rates of the display 18. It may be appreciated that the order or sequence of the blocks 94-104 may be varied or re-sequenced. Further, while the flow chart 92 indicates a touch indication as the motivation for beginning the process of increasing the refresh rate of the display 18, the processor core complex 12 may instruct the display 18 to vary the refresh rate based on the motion speed 68 of the moving image 46 absent any touch indication. That is, the flow chart 92 may begin at block 98 and block 100 may return to block 98 after the refresh rate is reduced.

Figure 13:
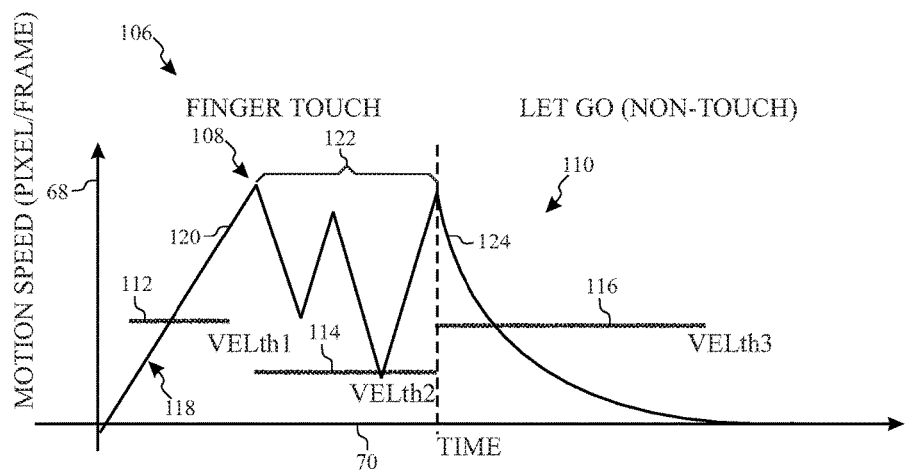
FIG. 13 is a chart illustrating image motion speed over time of the display of FIG. 7 during a finger touch operation and a non-touch operation, in accordance with an embodiment.

To further illustrate variable frame duration with multiple image velocity thresholds, FIG. 13 is a chart 106 illustrating an additional embodiment of the image motion speed 68 over the time 70 of the moving image 46 on the display 18. The chart 106 is divided into a portion 108 indicating operation of the display 18 with a finger touch (e.g., an operator scrolling on the display 18 with finger contact) and a portion 110 indicating operation of the display 18 after removing finger contact with the display 18 (e.g., when the operator ceases to scroll and removes the finger contact). The chart 106 also includes a first image velocity threshold 112 and a second image velocity threshold 114 within the portion 108, and a third image velocity threshold 116 within the portion 110. The image velocity thresholds 112, 114, and 116 may provide an indication of when the moving image 46 reaches a point at which it is desirable for the display 18 to transition to a different refresh rate.

A line 118 provides an indication of the motion speed over time. As the line 118 passes the image velocity thresholds 112, 114, and 116, the processor core complex 12 may instruct the display 18 to increase or decrease the refresh rate depending on whether the line 118 goes above the velocity threshold 112 or below the image velocity thresholds 114 and 116. For example, an initial portion 120 of the line 118 may cross the image velocity threshold 112 as the motion speed 68 of the moving image 46 increases. In such a situation, the processor core complex 12 may instruct the display 18 to increase the refresh rate, for example, from 60 Hz to 120 Hz when the line 118 crosses the image velocity threshold 112. In a subsequent portion 122, which may represent an operator alternating between scrolling up and down on the display 18, the image velocity threshold 114 may be used as a lower threshold velocity. As discussed above in the discussion of FIG. 11, the image velocity threshold 114 may be lower than the image velocity threshold 112 to prevent the processor core complex 12 from prematurely transitioning from a higher refresh rate to a lower refresh rate, or from undesirably cycling between higher and lower refresh rates.

Also depicted is a portion 124 of the line 118, which represents the motion speed 68 of the moving image 46 as the finger touch is removed. For example, the portion 124 may represent when an operator of the electronic device 10 removes their finger from the display 18 after swiping the display 18. During the portion 124, the image velocity threshold 116 may be greater than the image velocity threshold 114. The image velocity threshold 116 may be greater due to the removal of a finger from the display 18 indicating that the moving image 46 is unlikely to return to a greater image speed before a new finger touch operation is commenced on the display 18. Additionally, the image velocity threshold 116 may be equal to the image velocity threshold 112, greater than the image velocity threshold 112, or less than the image velocity threshold 112.

Figure 14:
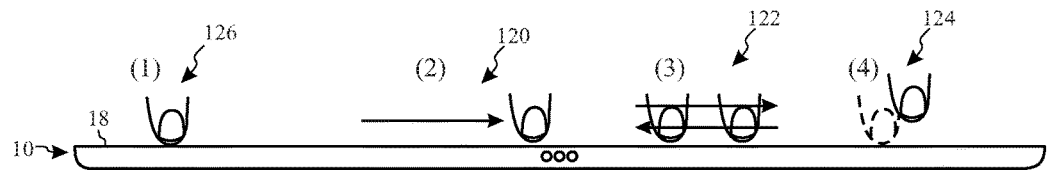
FIG. 14 is a side view of the electronic device of FIG. 1 and a finger interacting with the electronic device, in accordance with an embodiment.

FIG. 14 is a side view of the electronic device 10 with a finger interacting with the display 18 in various ways. For example, portion 126 represents an initial finger touch on the display 18. As discussed above, the initial finger touch may result in the processor core complex 12 instructing the display 18 to increase a refresh rate in preparation for subsequent higher velocity moving images 46.

Additionally, portion 120 represents a finger swipe on the display 18. The portion 120 may correspond with the portion 120 depicted in the chart 106 of FIG. 13. During the portion 120, the processor core complex 12 may instruct the display 18 to increase the refresh rate as the moving image 46 exceeds the image velocity threshold 112. Further, the portion 122 may also correspond with the portion 122 depicted in the chart 106 of FIG. 13. That is, the portion 122 may represent the finger scrolling back and forth on the display 18. During the portion 122, the refresh rate of the display may be maintained at a higher rate until the motion speed 68 of the moving image 46 falls below the image velocity threshold 114.

Moreover, portion 124 may correspond with the portion 124 depicted in the chart 106 of FIG. 13. That is, the portion 124 may represent a time when the finger is removed from the display 18. During the portion 124, the motion speed 68 of the moving image 46 may gradually decrease. Because it is unlikely that the motion speed 68 of the moving image 46 will increase during the portion 124, the image velocity threshold 116 may be greater than the image velocity threshold 114. Accordingly, as the motion speed 68 of the moving image 46 falls below the image velocity threshold 116, the processor core complex 12 may instruct the display 18 to reduce the refresh rate of the display 18.

Figure 15:
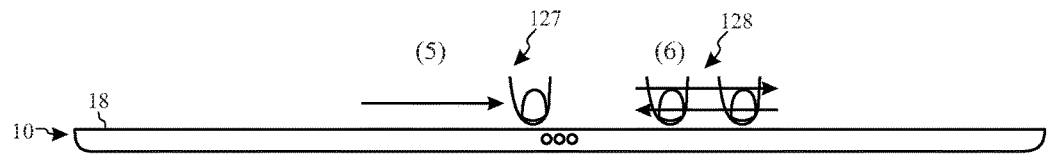
FIG. 15 is a side view of the electronic device of FIG. 1 and a finger interacting with the electronic device, in accordance with an embodiment.

Further, FIG. 15 is a side view of the electronic device 10 with a finger interacting with the display 18 in various ways. Instead of measuring the motion speed 68 of the moving image 46, the electronic device 10 may measure finger speed of the operator using the electronic device 10. For example, a touch sensor of the electronic device 10 may be able to measure finger speed before the electronic device 10 is able to measure the resulting motion speed 68 of the moving image 46. Accordingly, during portion 127, the electronic device 10 may measure the finger speed as the finger scrolls along the display 18. This may be generally equivalent to the portion 120 described above, but the finger speed is measured in place of or in addition to the motion speed 68 of the moving image 46. Additionally, during portion 128, the electronic device 10 may measure the finger speed as the finger scrolls back and forth on the display 18. This may be generally equivalent to the portion 122 described above, but the finger speed may be measured in place of or in addition to the motion speed 68 of the moving image 46.

It may be appreciated that the electronic device 10 may have finger speed thresholds that operate in much the same way as the image velocity thresholds described above. That is, the finger speed thresholds may be established such that the refresh rate of the display 18 is adjusted based on the finger speed of the operator during interaction with the display 18 instead of adjusting the refresh rate based on the motion speed 68 of the moving image 46. Adjusting the refresh rate of the display 18 may save the processor core complex 12 operating time by limiting the processing time lag between finger motion and a corresponding response of the moving image 46.

Figure 16:
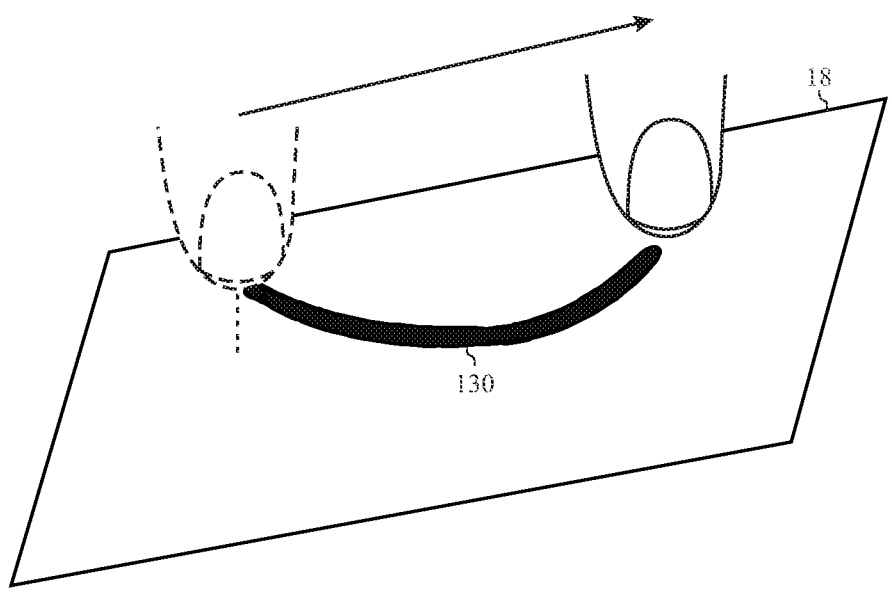
FIG. 16 is a perspective view of a portion of the electronic device of FIG. 1 and a finger performing a drawing operation on a display of the electronic device, in accordance with an embodiment.

In addition to measuring the motion speed 68 of the moving image 46 and the finger speed of the operator, the electronic device may also measure a speed of drawing animations. To help illustrate, FIG. 16 is a perspective view of a finger performing a drawing operation on a portion of the display 18 of the electronic device 10. The drawing operation may generate a line 130 or any other animation effect resulting from movement of the finger across the display 18. The electronic device may measure the drawing speed of the line 130 and compare the drawing speed to a drawing velocity threshold. Similar to the image velocity thresholds 112, 114, and 116 described above, as the drawing speed exceeds the drawing velocity threshold, the processor core complex 12 may instruct the display 18 to increase the refresh rate of the display 18. Likewise, when the drawing speed falls below the drawing velocity threshold, the processor core complex 12 may instruct the display 18 to decrease the refresh rate of the display 18. Further, the electronic device 10 may include a single drawing velocity threshold similar to the image velocity threshold 60 described in FIG. 9, or the electronic device 10 may include multiple drawing velocity thresholds similar to the image velocity thresholds 112, 114, and 116 of FIG. 13.

Figure 17:
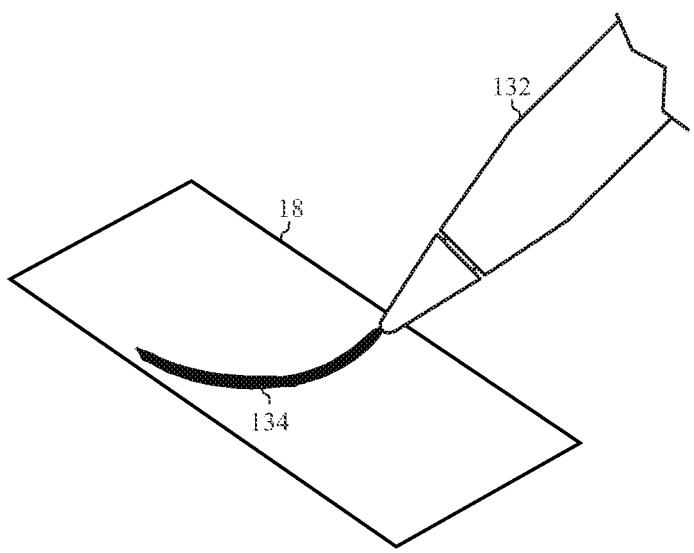
FIG. 17 is a perspective view of a portion of the electronic device of FIG. 1 and a stylus performing a drawing operation on a display of the electronic device, in accordance with an embodiment.

Similarly, FIG. 17 is a perspective view of a stylus 132 performing a drawing operation on a portion of the display 18 of the electronic device 10. The drawing operation may generate a line 134 or any other animation effect resulting from movement of the stylus 132 across the display 18. The electronic device 10 may measure the drawing speed of the line 134 and compare the drawing speed to a drawing velocity threshold. As the drawing speed exceeds the drawing velocity threshold, the processor core complex 12 may instruct the display 18 to increase the refresh rate of the display 18. Likewise, when the drawing speed falls below the drawing velocity threshold, the processor core complex 12 may instruct the display 18 to decrease the refresh rate of the display 18. Further, the electronic device 10 may include a single drawing velocity threshold similar to the image velocity threshold 60 described in FIG. 9, or the electronic device 10 may include multiple drawing velocity thresholds similar to the image velocity thresholds 112, 114, and 116 of FIG. 13.

Additionally or alternatively, the electronic device 10 may measure motion speed of the stylus 132 using the electronic device 10 in a manner similar to measuring finger speed, as described in the discussion of FIG. 15. For example, a touch sensor of the electronic device 10 may be able to measure speed of the stylus 132 before the electronic device 10 is able to measure the resulting motion speed 68 of the moving image 46. Accordingly, the electronic device 10 may measure the speed of the stylus 132 as the stylus 132 scrolls along the display 18. This may be generally equivalent to the portion 127 described above in the discussion of FIG. 15, but the speed of the stylus 132 is measured in place of the finger speed. Additionally, the electronic device 10 may measure the speed of the stylus 132 as the stylus 132 scrolls back and forth on the display 18. This may be generally equivalent to the portion 128 described above in the discussion of FIG. 15, but the speed of the stylus 132 may be measured in place of the finger speed.

It may be appreciated that the electronic device 10 may have speed thresholds for the stylus 132 that operate in much the same way as the image velocity thresholds and finger speed thresholds described above. That is, the speed thresholds of the stylus 132 may be established such that the refresh rate of the display 18 is adjusted based on the speed of the stylus 132 during interaction with the display 18 instead of adjusting the refresh rate based on the motion speed 68 of the moving image 46. Adjusting the refresh rate of the display 18 may save the processor core complex 12 operating time by limiting the processing time lag between motion of the stylus 132 and a corresponding response of the line 134 or the moving image 46.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device, comprising:
  a display panel comprising a plurality of pixels configured to display an image and configured to operate at multiple refresh rates; and
  a processor communicatively coupled to the display panel, wherein the processor is configured to:
    determine a motion speed of at least part of the image;
    determine whether a touch indication is detected during display of the image; and
    instruct the display panel to transition from a first refresh rate to a second refresh rate greater than the first refresh rate in response to the motion speed being greater than a motion threshold, wherein the motion threshold is a first value when the touch indication is not detected and a second value less than the first value of the motion threshold when the touch indication is detected.

2. The electronic device of claim 1, wherein the processor is configured to detect the touch indication when an object contacts a surface of the display panel.

3. The electronic device of claim 1, wherein the processor is configured to instruct the display panel to transition from the first refresh rate of approximately 60 hertz (Hz) to the second refresh rate of approximately 120 Hz in response to the motion speed being greater than the motion threshold.

4. The electronic device of claim 1, wherein the processor is configured to instruct the display panel to transition from the first refresh rate of approximately 30 hertz (Hz) to the second refresh rate of approximately 60 Hz in response to the motion speed being greater than the motion threshold.

5. The electronic device of claim 1, wherein the processor is configured to instruct the display panel to transition from the first refresh rate of approximately 120 hertz (Hz) to the second refresh rate of approximately 240 Hz in response to the motion speed being greater than the motion threshold.

6. The electronic device of claim 1, wherein the motion speed comprises movement of content of the image as a result of one or more touch indications on the display panel.

7. The electronic device of claim 1, wherein the processor is configured to:
  decrease the motion threshold from the first value to the second value when the touch indication is detected during display of the image; and
  increase the motion threshold from the second value to the first value when the touch indication is not detected during display of the image.

8. The electronic device of claim 1, wherein the processor is configured to:
  instruct the display panel to transition from the first refresh rate to the second refresh rate greater than the first refresh rate to facilitate improving image quality; and
  instruct the display panel to transition from the second refresh rate to the first refresh rate to facilitate reducing a power consumption of the electronic device.

9. A method of operating an electronic display, comprising:
  receiving an image to be displayed on the electronic display at a refresh rate;
  determining a motion speed of at least part of the image;
  determining whether a user input operation is detected on the electronic display; and
  instructing the electronic display to transition from a first refresh rate to a second refresh rate greater than the first refresh rate in response to the motion speed being greater than an image velocity threshold, wherein the image velocity threshold is a first value when the user input operation is not detected and a second value less than the first value of the image velocity threshold when the user input operation is detected.

10. The method of claim 9, wherein the motion speed comprises movement of content of the image as a result of the user input operation on the electronic display.

11. The method of claim 9, wherein the user input operation comprises a touch indication in response to an object contacting the surface of the electronic display, wherein the object comprises a finger, a stylus, or any combination thereof.

12. The method of claim 9, comprising:
  decreasing the image velocity threshold from the first value to the second value in response to the user input operation being detected during display of the image; and
  increasing the image velocity threshold from the second value to the first value in response to the user input operation not being detected during display of the image.

13. The method of claim 9, wherein determining whether the motion speed is greater than the image velocity threshold comprises determining whether the image velocity threshold is greater than approximately 15 pixels/frame.

14. The method of claim 9, wherein determining whether the motion speed is greater than the image velocity threshold comprises determining whether the image velocity threshold is greater than approximately 11 pixels/frame.

15. The method of claim 9, wherein determining whether the motion speed is greater than the image velocity threshold comprises determining whether the image velocity threshold is greater than approximately 20 pixels/frame.

16. A non-transitory computer-readable medium having computer executable code stored thereon, the code comprising instructions to:
- cause an electronic display to display an image;
- determine a motion speed of at least part of the image;
- determine whether a touch operation is occurring on the electronic display; and
- cause the electronic display to transition from a first refresh rate to a second refresh rate greater than the first refresh rate in response to the motion speed being greater than an image velocity threshold, wherein the image velocity threshold is a first value when the user input operation is not detected and a second value less than the first value of the image velocity threshold when the touch operation is detected.

17. The non-transitory computer-readable medium of claim 16, wherein the code comprises instructions to cause the electronic display to reduce the refresh rate based at least in part on a minimum blur effective width difference between the second refresh rate and the first refresh rate of the electronic display.

18. The non-transitory computer-readable medium of claim 16, wherein the image velocity threshold is in a range between 5 pixels/frame and 20 pixels/frame.

19. The non-transitory computer-readable medium of claim 16, comprising instructions to:
- increase the image velocity threshold from the first value to the second value in response to the touch operation occurring on the electronic display; and
- decrease the image velocity threshold from the second value to the first value in response to the touch operation no longer occurring on the electronic display.

* * * * *

UNITED STATES PATENT AND TRADEMARK OFFICE
CERTIFICATE OF CORRECTION

PATENT NO. : 10,133,403 B2
APPLICATION NO. : 15/275375
DATED : November 20, 2018
INVENTOR(S) : Chih-Wei Yeh et al.

Page 1 of 1

It is certified that error appears in the above-identified patent and that said Letters Patent is hereby corrected as shown below:

In the Claims

In Column 15, Lines 12 and 13 (Claim 16), replace "user input operation" with --touch operation--.

Signed and Sealed this
Sixteenth Day of July, 2019

Andrei Iancu
*Director of the United States Patent and Trademark Office*